(12) United States Patent
Ohuchida

(10) Patent No.: US 7,426,169 B2
(45) Date of Patent: Sep. 16, 2008

(54) OPTICAL PICKUP APPARATUS AND OPTICAL PICKUP METHOD

(75) Inventor: Shigeru Ohuchida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 919 days.

(21) Appl. No.: 10/937,456

(22) Filed: Sep. 9, 2004

(65) Prior Publication Data

US 2005/0036431 A1 Feb. 17, 2005

Related U.S. Application Data

(62) Division of application No. 09/864,569, filed on May 24, 2001, now Pat. No. 6,810,001.

(30) Foreign Application Priority Data

May 26, 2000 (JP) ............... 2000-156986

(51) Int. Cl.
G11B 7/00 (2006.01)
(52) U.S. Cl. .............. 369/112.07; 369/112.12
(58) Field of Classification Search .......... None
See application file for complete search history.

(56) References Cited

U.S. PATENT DOCUMENTS

| | | | |
|---|---|---|---|
| 5,191,204 A | 3/1993 | Dickson et al. |
| 5,247,167 A | 9/1993 | Bargerhuff et al. |
| 5,428,588 A | 6/1995 | Ohuchida |
| 5,500,846 A | 3/1996 | Ophey |
| 5,684,779 A | 11/1997 | Ohuchida et al. |
| 5,875,167 A | 2/1999 | Katayama |
| 6,072,570 A | 6/2000 | Chipman et al. |
| 6,181,668 B1 | 1/2001 | Kajiyama et al. |
| 6,353,587 B1 | 3/2002 | Hong et al. |
| 6,552,990 B1 | 4/2003 | Kajiyama et al. |

2005/0058027 A1 * 3/2005 Kitaoka et al. ........... 369/13.3

FOREIGN PATENT DOCUMENTS

JP 7-192295 7/1995

(Continued)

OTHER PUBLICATIONS

Jan. 28, 2004 official Communication and European Search Report.

(Continued)

Primary Examiner—Paul Huber
(74) Attorney, Agent, or Firm—Cooper & Dunham LLP

(57) ABSTRACT

An optical pickup apparatus for reading/reproducing data on an optical recording medium, includes a plurality of laser diodes configured to emit laser light of different wavelengths respectively, a photodetection device configured to detect each laser light, a diffraction type-optical device configured to transmit each laser light from the plurality of laser diodes to the optical recording medium, and to diffract the light reflected from the optical recording medium to the photodetection device, and wherein the diffraction type-optical device includes a plurality of reflecting type-diffraction elements configured to reflect and diffract each laser light of a corresponding wavelength in the laser light from the plurality of light diodes, to the photodetection device so that the photodetection device can detect each laser light of the corresponding wavelength for monitoring each of the laser light, and a suppression setting device configured to set each of the plurality of reflecting type-diffraction elements to suppress laser light other than the laser light of the corresponding wavelength to the photodetection device.

5 Claims, 8 Drawing Sheets

FOREIGN PATENT DOCUMENTS

| | | |
|---|---|---|
| JP | 9-63111 | 3/1997 |
| JP | 10-269613 | 10/1998 |
| JP | 10-319318 | 12/1998 |
| JP | 11-39701 | 2/1999 |
| JP | 11-296895 | 10/1999 |

OTHER PUBLICATIONS

U.S. Appl. No. 09/344,120, filed Jun. 24, 1999.
U.S. Appl. No. 09/494,549, filed Jan. 31, 2000.

* cited by examiner

OPTICAL PICKUP APPARATUS AND OPTICAL PICKUP METHOD

This application is a divisional, and claims the priority, of U.S. Ser. No. 09/864,569, filed May 24, 2001, now U.S. Pat. No. 6,810,001 the entire contents of which are incorporated herein by reference.

BACKGROUND

1. Field

This patent specification relates to an optical pickup apparatus which records/reproduces data on different kinds of optical recording media by using selectively laser light of different wavelengths.

2. Discussion of Related Art

In a pickup apparatus, a laser light from a laser diode is incident onto a signal recording surface of an optical recording medium by way of, for example, a hologram device, and light reflected from the signal recording surface is detected by a photodetection device by way of the hologram device, thereby recording/reproducing on an optical recording medium such as DVD or CD. The laser light is controlled to maintain an optimum level by monitoring an output level of the laser light in order to record/reproduce stably.

Therefore, conventionally, as illustrated in FIG. 9, a photodetection device for monitor 8 is arranged on an optical path in an optical pickup apparatus, and an output level of a laser light emitted from a laser diode 1 is detected by a photodetection device for monitor 8 and the control is performed on the basis of a detected value so that the laser light can be maintained at an optimum level. Numeral 3 is a hologram device and numeral 4 is a collimator lens.

However, in this method, a photodetection device for monitor 8 in addition to a photodetection device for the main signal needs to be arranged. The photodetection device for monitor 8 needs to fit in a limited space, thus complicating the design and, moreover, a detection amount of the photodetection device for monitor 8 changes greatly by inaccuracies in its positioning.

In order to deal with this problem, as illustrated in FIG. 10, a method for detecting the level of the laser light from the laser diode 1 is adopted such that a reflection hologram 9 is formed on the hologram device 3, and the laser light from the laser diode 1 is reflected and diffracted by the reflection hologram 9 and is detected by a photodetection device 7. In this method, the photodetection device for the main signal and the photodetection device for monitoring can be formed on one plate, and the number of devices is reduced and further the photodetection device is simply adjusted.

In this case, when laser light of different wavelengths (635 nm or 650 nm, and 780 nm) from the laser diode 1 and a laser diode 2 are used, the laser light of 635 nm or 650 nm from the laser diode 1 and the laser light of 780 nm from the laser diode 2 pass the hologram device 3 as illustrated in FIG. 11A, and a reflecting type-diffraction element 10a which reflects the laser light of 635 nm or 650 nm and a reflecting type-diffraction element 10b which reflects the laser light of 780 nm are formed.

(In this patent specification, the term "laser light" refers to a beam (or beams) of light emitted from a laser (of from lasers), reflected by an optical recording medium, and/or acted on by devices such as lenses, diffraction grantings, etc.

Each of the reflection light from the reflecting type-diffraction element 10a and the reflection light from the reflecting type-diffraction element 10b is guided to and detected on a photodetection element for monitor 7m formed in the photodetection device 7, and the output levels of the laser light from the laser diodes 1 and 2 can be monitored respectively.

When the output levels of laser light of the different wavelengths described above are monitored, the laser diodes 1 and 2 are spaced apart each other and the laser light emitted from a collimator lens 4 proceeds in a slant direction, and is incident to an objective lens slantingly, and thus aberration occurs in a spot formed on the optical recording medium Therefore, the laser diodes 1 and 2 can be very close to each other, and still the emitted patterns from the laser diodes 1 and 2 on the surface of the hologram device 3 would be as illustrated in FIG. 11A. Thus, for example, when the laser light 1 is illuminated, the laser light of 635 nm or 650 nm is emitted, however, the laser light is incident not only onto the reflecting type-diffraction element 10a but also the reflecting type-diffraction element 10b as illustrated in FIG. 11B. Numeral 25a is a diffraction light from the diffraction element 10a and numeral 25b is a diffraction light from the diffraction element 10b.

In this case, as illustrated in FIG. 11C, the reflection light from the reflecting type-diffraction device 10a forms a small spot 26a and focuses, and the output level of the laser light from the laser diode 1 can be detected. On the other hand, the reflection light from the reflecting type-diffraction element 10b becomes a large spot 26b before focusing on the photodetection device 7, and is incident onto a different photodetection element 27 and thereby a flare light occurs. As a result, the detection accuracy of the output level of the laser light from the laser diode 1 can decrease.

SUMMARY

Accordingly, an object of this patent specification is to provide an optical pickup apparatus in the number of components devices is decreased and complicated adjustment is not necessary, and further output levels of laser light of plural wavelengths can be accurately monitored by suppressing flare light.

According to a preferred embodiment, an optical pickup apparatus for reading/reproducing data on an optical recording medium, includes a plurality of laser diodes configured to emit laser light of different wavelengths respectively, a photodetection device configured to detect each laser light, a diffraction type-optical device configured to transmit each laser light from the plurality of laser diodes to the optical recording medium, and to diffract each laser light from the optical recording medium to the photodetection device; and wherein the diffraction type-optical device includes a plurality of reflecting type-diffraction elements configured to reflect and diffract each laser light of a corresponding wavelength from the plurality of light diodes, to the photodetection device so that the photodetection device can detect each laser light of the corresponding wavelength to monitor each laser light, and a suppression setting device configured to set each of the plurality of reflecting type-diffraction elements to suppress reflection of laser light other than the laser light of the corresponding wavelength to the photodetection device.

Further, the suppression setting device sets each of the plurality of reflecting type-diffraction elements at a position such that only the laser light of the corresponding wavelength is diffracted.

Further, the suppression setting device sets each of the plurality of reflecting type-diffraction elements to enhance only diffraction efficiency of the laser light of the corresponding wavelength.

Further, the suppression setting device sets each of the plurality of reflecting type-diffraction elements to diffract only the laser light of the corresponding wavelength by suitably coating each of the plurality of reflecting type-diffraction elements.

Still further, the plurality of reflecting type-diffraction elements are formed on a surface in the diffraction type-optical device facing the optical recording medium, and coating is performed so as to transmit only the laser light of the corresponding wavelength, on a surface of a side of the laser diodes in the diffraction type-optical device.

According to another preferred embodiment, an optical pickup apparatus for reading/reproducing data on an optical recording medium, includes a plurality of laser diodes configured to emit laser light of different wavelengths respectively, a photodetection device configured to detect each laser light, a diffraction type-optical device configured to transmit each laser light from the plurality of laser diodes to the optical recording medium, and to diffract each laser light from the optical recording medium to the photodetection device, and wherein the diffraction type-optical device includes a reflecting type-diffraction element configured to reflect and diffract a laser light of an intermediate wavelength between the wavelengths of the laser light, onto a center position in the photodetection device, where the photodetection device is configured to detect each of the laser light from the plurality of reflecting type-diffraction elements for monitoring of the each of the laser light.

According to another preferred embodiment, an optical pickup apparatus for reading/reproducing data on an optical recording medium, includes a plurality of laser diodes configured to emit laser light of different wavelengths respectively, a photodetection device configured to detect each laser light, a diffraction type-optical device configured to transmit each laser light from the plurality of laser diodes to the optical recording medium, and to diffract each laser light from the optical recording medium to the photodetection device, and wherein the diffraction type-optical device is a polarization diffraction device which has reflecting type-diffraction elements, each of which corresponds to each of the wavelengths, each of which has diffraction efficiency depending on a polarization direction of an incident light, and each of which has high diffraction efficiency with respect to a corresponding wavelength.

Further, the optical pickup apparatus further includes a suppression setting device where each of the plurality of reflecting type-diffraction elements suppresses reflection of a laser light other than a laser light of the corresponding wavelength to the photodetection device.

Still further, the polarization diffraction device is made from an organic group macromolecule film.

According to another preferred embodiment, an optical pickup method for reading/reproducing data on an optical recording medium, includes emitting laser light of different wavelengths respectively by a plurality of laser diodes, detecting each laser light by a photodetection device, transmitting each laser light from the plurality of laser diodes to the optical recording medium, and diffracting each laser light from the optical recording medium to the photodetection device by a diffraction type-optical device, and reflecting and diffracting each laser light of a corresponding wavelength in the laser lights from the plurality of light diodes, to the photodetection device by a plurality of reflecting type-diffraction elements in the diffraction type-optical device, and detecting each laser light of the corresponding wavelength for monitoring each laser light by the photodetection device, and setting each of the plurality of reflecting type-diffraction elements to suppress to reflection of a laser light other than the laser light of the corresponding wavelength to the photodetection device by a suppression setting device.

According to another preferred embodiment, an optical pickup method for reading/reproducing data on an optical recording medium, includes emitting laser light of different wavelengths respectively by a plurality of laser diodes, detecting each laser light by a photodetection device, transmitting each laser light from the plurality of laser diodes to the optical recording medium, and diffracting each laser light from the optical recording medium to the photodetection device by a diffraction type-optical device, and reflecting and diffracting a laser light of an intermediate wavelength between the wavelengths of the laser light, onto a center position in the photodetection device by a reflecting type-diffraction element in the diffraction type-optical device, and detecting each laser light from the plurality of reflecting type-diffraction elements for monitoring each laser light by the photodetection device.

According to another preferred embodiment, an optical pickup method for reading/reproducing data on an optical recording medium, includes emitting laser light of different wavelengths respectively by a plurality of laser diodes, detecting each laser light by a photodetection device, transmitting each laser light from the plurality of light diodes to the optical recording medium, and diffracting each laser light from the optical recording medium to the photodetection device by a diffraction type-optical device, and diffracting at efficiency depending on a polarization direction of an incident light, and diffracting at high efficiency with respect to a corresponding wavelength, by a polarization diffraction device which has diffraction type-optical elements each of which corresponds to each of the wavelengths.

BRIEF DESCRIPTION OF THE DRAWINGS

A more complete appreciation of the disclosure herein and many of the attendant advantages thereof will be readily obtained as the same becomes better understood by reference to the following detailed description, particularly when considered in connection with the accompanying drawings, wherein.

DETAILED DESCRIPTION OF THE PREFERRED EMBODIMENTS

Figure 1:
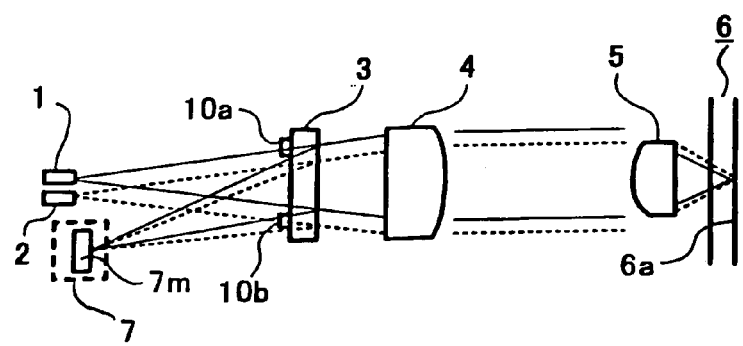
FIG. 1 is an explanation view illustrating a first referred embodiment.

Referring now to the drawings, wherein like reference numerals designate identical or corresponding parts throughout the several views, preferred embodiments are described.

Referring to FIGS. 1-2, a first embodiment will be described.

Figure 2A:
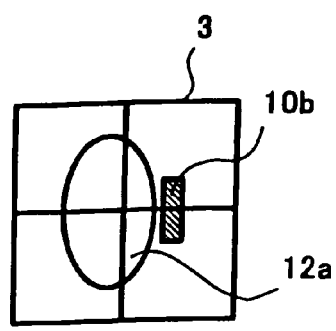
FIGS. 2A to 2B are explanation views of a relationship between an emitted laser light pattern and a reflecting type-diffraction element of the first embodiment.
Figure 2B:
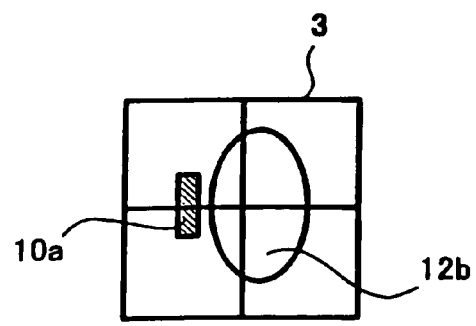

FIG. 1 is a view illustrating the overall structure of this embodiment, and FIGS. 2A to 2B are views illustrating a relationship between an emitted laser pattern and a reflecting type-diffraction element of this embodiment.

In this embodiment, as illustrated in FIG. 1, a laser diode 1 emitting a laser light of wavelength 635 nm or 650 nm and a laser diode 2 emitting a laser light of wavelength 780 nm are arranged, and a laser light emitted from the laser diode 1 or 2 is transmitted through a hologram device 3 of a diffraction type-optical device and is incident on a collimator lens 4 arranged after the hologram device 3. The laser light from the laser diode 1 or 2 is converted to a parallel light by the collimator lens 4, and is focused by an objective lens 5, and is incident on a signal recording surface 6a of an optical recording medium 6 as a focused spot. When recording, data is recorded in this manner onto the signal recording surface 6a of the optical recording medium 6.

Further, a reflected laser light of wavelength 635 nm or 650 nm or a reflected laser light of wavelength 780 nm which is reflected from the signal recording surface 6a is transmitted through the objective lens 5 and is converted to a parallel light. The laser light passes through the collimator lens 4, is incident to the hologram device 3, and is incident onto a photodetection device 7 after being diffracted by the hologram device 3. Thereby, recorded data of the signal recording surface 6a is detected and reproducing operation is performed.

In this embodiment, as illustrated in FIG. 1, a reflecting type-diffraction element 10a which reflects the laser light of wavelength 635 nm or 650 nm and a reflecting type-diffraction element 10b which reflects the laser light of wavelength 780 nm are formed and arranged at the side of the laser diodes 1 and 2 in the hologram device 3. With respect to positions of the reflecting type-diffraction elements 10a and 10b arranged on the surface of the hologram device 3, the reflecting type-diffraction element 10b is arranged at a position to which an emitted pattern 12a of the laser light of wavelength 635 nm or 650 nm from the laser diode 1 is not irradiated, as illustrated in FIG. 2(a), and the reflecting type-diffraction element 10a is arranged at a position to which an emitted pattern 12b of the laser light of wavelength 780 nm from the laser diode 2 is not irradiated, as illustrated in FIG. 2B.

In this embodiment of such a structure, when the output level of the laser light of wavelength 635 nm or 650 nm is monitored, the emitted pattern 12a from the laser diode 1 is irradiated only onto the reflecting type-diffraction element 10a and is not irradiated onto the reflecting type-diffraction element 10b. Thus, only the laser light of wavelength 635 nm or 650 nm reflected from the reflecting type-diffraction element 10a is irradiated onto the monitoring photodetection element 7m of the photodetection device 7 as a focused small spot, and the incident light is not irradiated onto a photodetection element for the main signal, flare is greatly suppressed.

Similarly, when the output level of the laser light of wavelength 780 nm emitted from the laser diode 2 is monitored, the emitted pattern 12b from the laser diode 2 is irradiated only onto the reflecting type-diffraction action element 10b and is not irradiated onto the reflecting type-diffraction element 10a. Therefore, only the laser light of wavelength 780 nm reflected from the reflecting type-diffraction element 10b is incident onto the monitoring photodetection element 7m of the photodetection device 7 as a focused small spot, and is not incident onto the photodetection element for the main signal of the photodetection device 7, and therefore flare is suppressed. As described above, a suppression setting device is realized.

For this reason, according to this embodiment, the monitoring photodetection element 7m is integrated with the photodetection device 7, and thereby it is possible to decrease the number of devices and to simplify the structure and the adjusting method. At the same time, the reflecting type-diffraction element 10b is arranged at the position on the surface of the hologram device 3 onto which the emitted pattern of the laser light of wavelength 635 nm or 650 nm from the laser diode 1 is not irradiated, and the reflecting type-diffraction element 10a is arranged at the position on the surface thereof onto which the emitted pattern of the laser light of wavelength 780 nm is not irradiated. Thereby, flare is suppressed and the output level of the laser light from the laser diode 1 or 2 is accurately detected, and therefore recording/reproducing operation with respect to the optical recording medium 6 can be performed at high quality.

Figure 3:
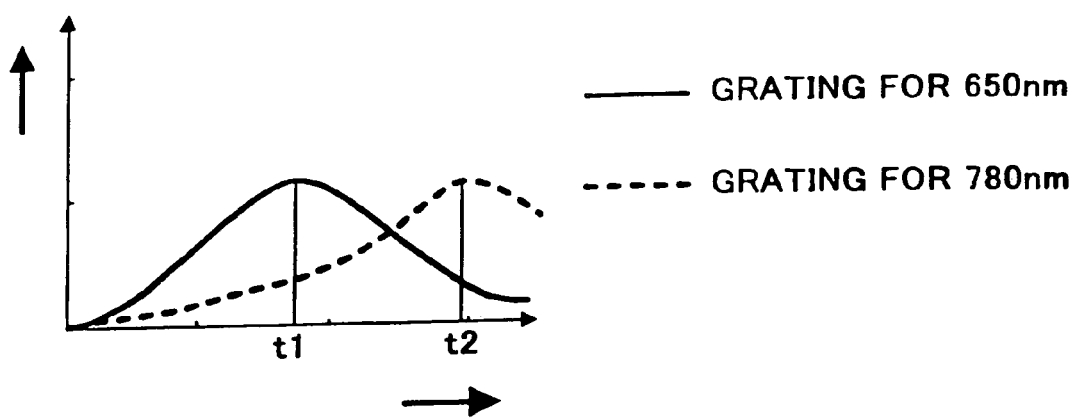
FIG. 3 is an explanation view of a second embodiment.

Referring to FIG. 3, a second embodiment will be described.

In the first embodiment described above, the reflecting type-diffraction element 10b is arranged at the position onto which the emitted pattern 12a of the laser light of wavelength 635 nm or 650 nm from the laser diode 1 is not irradiated, and the reflecting type-diffraction element 10a is arranged at the position onto which the emitted pattern 12b of the laser light of wavelength 780 nm from the laser diode 2 is not irradiated. In this case, there is limited space where the reflecting type-diffraction elements can be arranged.

Thus, there may be relatively low intensity of monitoring detection on the photodetection element 7m.

In order to address this, in this embodiment, grating depths of the reflecting type-diffraction elements 10a and 10b are selected respectively, and diffraction efficiency of the laser light with respect to a corresponding wavelength thereof is enhanced. Thereby, some laser light of wavelength other than the corresponding wavelength is allowed to be incident onto the corresponding reflecting type-diffraction element, and the reflecting type-diffraction elements 10a and 10b are arranged respectively at positions where sufficiently greater incident amounts of the laser lights of the corresponding wavelengths can be obtained. The remaining structure in this embodiment can be the same as in the first embodiment, and therefore its description will not be repeated.

Generally, as illustrated in FIG. 3, a gentle bell-shaped curve relates grating depth versus diffraction efficiency corresponding to each wavelength. A characteristic curve illustrated by a solid line in FIG. 3 shows a relationship between the grating depth and the diffraction efficiency of the reflecting type-diffraction element 10a on which the laser light of wavelength 650 nm is reflected, and a characteristic curve illustrated by a dashed line shows a relationship between the grating depth and the diffraction efficiency of the reflecting type-diffraction element 10b on which the laser light of wavelength 780 nm is reflected.

In this embodiment, on the basis of the characteristics in FIG. 3, the grating depth of the reflecting type-diffraction element 10a is set to t1 at which the laser light of wavelength 650 nm is diffracted at high efficiency, and thereby the diffraction efficiency of the laser light of wavelength 780 nm is set at a low level.

Therefore, the reflecting type-diffraction element 10a is arranged at a position at which the laser light of wavelength 650 nm is irradiated at sufficiently high intensity, and thereby even if the laser light of wavelength 780 nm also is irradiated, its diffraction efficiency can be low enough and flare can be suppressed.

Similarly as described above, the reflecting type-diffraction element 10b is arranged at a position at which the laser light of wavelength 780 nm is irradiated at sufficiently high intensity, and thereby even if the laser light of wavelength 650 nm is incident, its diffraction efficiency can be low enough and flare can be suppressed. As described above, a suppression setting device is realized.

For this reason, according to this embodiment, the monitoring photodetection element 7m is integrated with the photodetection device 7, and thereby the number of devices can be decreased and the structure and the adjusting method can be simplified. At the same time, the grating depth of the reflecting type-diffraction element 10a is set to t1 at which the laser light of wavelength 650 nm is diffracted at high efficiency and the laser light of wavelength 780 nm is diffracted at a low efficiency, and also the grating depth of the reflecting type-diffraction element 10b is set to t2 at which the laser light of wavelength 780 nm is diffracted at high efficiency and the laser light of wavelength 650 nm is diffracted at low efficiency. Thereby, each of the reflecting type-diffraction elements 10a and 10b reflects the laser light of the corresponding wavelength at high intensity, and thus the monitoring photodetection element 7m detects each laser light at high signal to noise ratio and flare by the laser light of the wavelength other than the corresponding wavelength can be adequately suppressed. Therefore, the recording/reproducing operation with respect to the optical recording medium 6 can be performed at high quality.

Figure 4A:
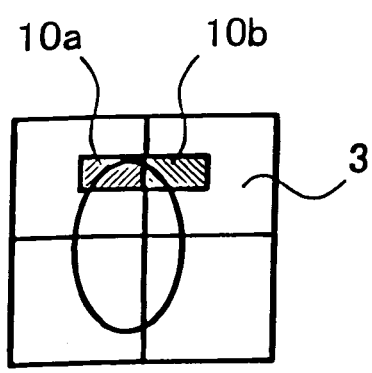
FIGS. 4A to 4B are explanation views of a third embodiment.
Figure 4B:
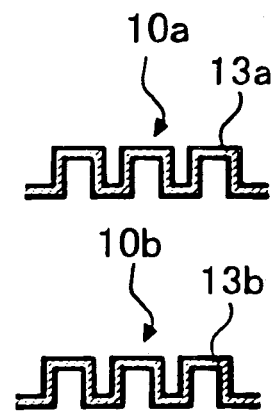

Referring to FIGS. 4A to 4C, a third embodiment will be described.

In the second embodiment described above, the grating depths of the reflecting type-diffraction elements 10a and 10b are selected and the diffraction efficiency to the laser light of the corresponding wavelength thereof is enhanced, and the diffraction efficiency of the laser light of the wavelength other than the corresponding wavelength is reduced. However, the diffraction efficiency is not zero and faint flare remains.

This embodiment illustrated in FIGS. 4A and 4B, a wavelength selecting film 13a which reflects the laser light of wavelength 635 nm or 650 nm and transmits the laser light of wavelength 780 nm is coated on the surface of the reflecting type-diffraction element 10a, and a wavelength selecting film 13b which reflects the laser light of wavelength 780 nm and transmits the laser light of wavelength 635 nm or 650 nm is coated on the surface of the reflecting type-diffraction element 10b.

The remaining structure in this embodiment is the same as those in the second embodiment, and therefore will not be repeated.

In this embodiment, the laser light of wavelength 635 nm or 650 nm which is irradiated to the reflecting type-diffraction element 10a is reflected on the reflecting type-diffraction element 10a, and the laser light of wavelength 780 nm which is irradiated to the reflecting type-diffraction element 10a is transmitted through the reflecting type-diffraction element 10a. Further, the laser light of wavelength 780 nm which is irradiated to the reflecting type-diffraction element 10b is reflected on the reflecting type-diffraction element 10b, and the laser light of wavelength 635 nm or 650 nm which is irradiated to the reflecting type-diffraction element 10b is transmitted through the reflecting type-diffraction element 10b. Therefore, only either the laser light of wavelength 635 nm or 650 nm, or that of wavelength 780 nm, is selected and is incident onto the monitoring photodetection element 7m, and the flare can be completely prevented. As described above, a suppression setting device is realized.

For this reason, according to this embodiment, the monitoring photodetection element 7m is integrated with the photodetection device 7, and thereby the number of devices can be decreased and the structure and the adjusting method can be simplified. The wavelength selecting film 13a which reflects the laser light of wavelength 635 nm or 650 nm, and transmits the laser light of wavelength 780 nm, is coated on the surface of the reflecting type-diffraction element 10a, and the wavelength selecting film 13b which reflects the laser light of wavelength 780 nm, and transmits the laser light of wavelength 635 nm or 650 nm, is coated on the surface of the reflecting type-diffraction element 10b. Thereby, flare can be prevented and the recording/reproducing operation with respect to the optical recording medium 6 is possible at high quality.

Figure 5A:
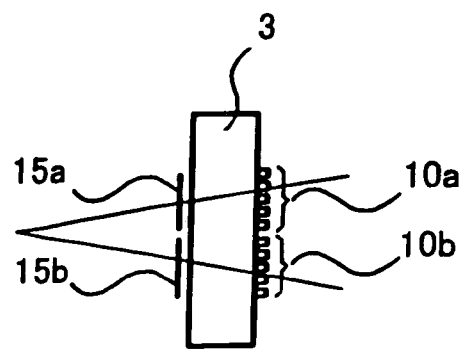
FIGS. 5A to 5B are explanation views of a fourth embodiment.
Figure 5B:
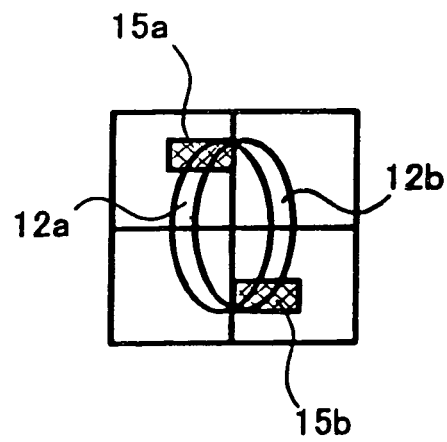

Referring to FIGS. 5A to 5B, a fourth embodiment will be described.

In the third embodiment described above, the wavelength selecting films 13a and 13b are coated on the surfaces of the reflecting type-diffraction elements 10a and 10b respectively. The grating pitch of the reflecting type-diffraction elements 10a and 10b is small, such as approximate 1 μm in some cases. Forming such wavelength selecting films 13a and 13b as a multilayer film can present difficulties.

In order to address this problem, in the embodiment, as illustrated in FIGS. 5A and 5B, the wavelength selecting film 15a which transmits the laser light of wavelength 635 nm or 650 nm and reflects the laser light of wavelength 780 nm, and the wavelength selecting film 15b which transmits the laser light of wavelength 780 nm and reflects the laser light of wavelength 635 nm or 650 nm, are coated on a surface of the hologram device 3 facing the laser diodes 1 and 2. The reflecting type-diffraction element 10a of the laser light of wavelength 635 nm or 650 nm is aligned with the wavelength selecting film 15a, and the reflecting type-diffraction element 10b of the laser light of wavelength 780 nm is aligned with the wavelength selecting film 15b. Both elements 10a and 10b face the collimator lens 4.

The remaining structure in this embodiment is the same as those in the third embodiment, and therefore the description will not be repeated.

In this embodiment, the laser light of wavelength 635 nm or 650 nm is transmitted through the wavelength selecting film 15a and is reflected on the reflecting type-diffraction element 10a, and the laser light thereof is transmitted through the wavelength selecting film 15a again and is incident onto the photodetection element for monitor 7m. As a result, the output level of the laser light of wavelength 635 nm or 650 nm is monitored and flare is suppressed. Similarly, the laser light of wavelength 780 nm is transmitted through the wavelength selecting film 15b and is reflected on the reflecting type-diffraction element 10a, and is transmitted through the wavelength selecting film 15b again and is incident onto the monitoring photodetection element 7m. As a result, the output level of the laser light of wavelength 780 nm is monitored and flare is suppressed. As described above, a suppression setting device is realized.

As described above in the second embodiment, if the grating depths of the reflecting type-diffraction elements 10a and 10b are selected so that the laser light of the corresponding wavelength of the respective wavelengths can be high in diffraction efficiency and the laser light of the wavelength other than the corresponding wavelength thereof can be low in diffraction efficiency, flare can be further suppressed.

In this embodiment, if it is difficult to form the wavelength selecting films 15a and 15b of multilayer film next to each other, as in FIG. 4A, the wavelength selecting films 15a and 15b can be formed as in FIG. 5B, separated from each other, at the upper left and lower right quadrants, respectively, of the emitted patterns 12a and 12b of the laser light, as illustrated in FIG. 5B.

For this reason, according to this embodiment, the monitoring photodetection element 7m is integrated with the photodetection device 7, and thereby the number of devices can be decreased and the structure and the adjusting method can be simplified. The wavelength selecting films 15a and 15b and the reflecting type-diffraction elements 10a and 10b are formed at opposite sides of the hologram device 3 respectively, and thereby the wavelength selecting films 15a and 15b can be accurately formed with respect to the reflecting type-diffraction elements 10a and 10b of small grating pitch, and therefore flare can be prevented and the recording/reproducing operation with respect to the optical recording medium 6 is possible at high quality.

Figures 6A, 6B, 6C:
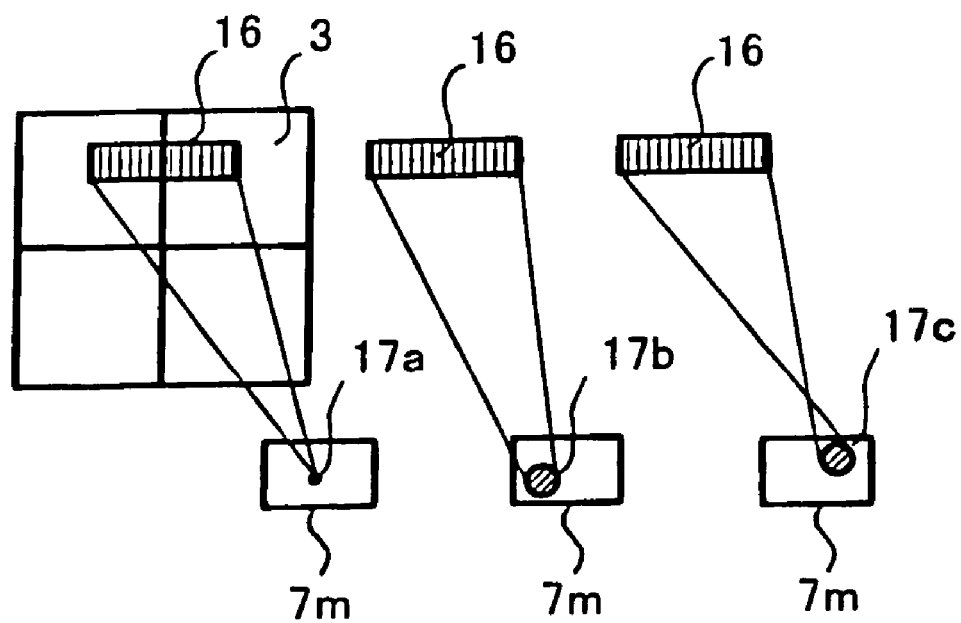
FIGS. 6A to 6C are explanation views of a fifth embodiment.

Referring to FIGS. 6A to 6C, a fifth embodiment will be described.

In this embodiment, instead of the reflecting type-diffraction elements 10a and 10b in the embodiments described above, one reflecting type-diffraction element 16 which reflects and diffracts a laser light of wavelength 710 nm which is an almost intermediate wavelength between the laser light of wavelength 635 nm or 650 nm and that of wavelength 780 nm, is formed on the hologram device 3.

The remaining structure in this embodiment is the same as those in the first embodiment, and therefore its description will not be repeated.

In this embodiment, as illustrated in FIG. 6A, the laser light of wavelength 710 nm is focused onto a center position of the monitoring photodetection element 7m as a spot 17a of small diameter. However, the laser light of wavelength 650 nm is focused near one end of the photodetection element 7m as a spot 17b of wide diameter as illustrated in FIG. 6B, and the laser light of wavelength 780 nm is focused near the other end thereof as a spot 17c of wide diameter as illustrated in FIG. 6C.

In this case, if an area of the photodetection element 7m is large, the output level of the laser light can be monitored as the influence of chromatic aberration of approximate 70 nm can be sufficient.

For this reason, according to this embodiment, the monitoring photodetection element 7m is integrated with the photodetection device 7 and the reflecting type-diffraction element is configured by one reflecting type-diffraction element 16. Thereby, the number of devices can be decreased and the structure and the adjusting method can be simplified. In addition, the laser light of wavelength 635 nm or 650 nm and that of wavelength 780 nm can be adequately detected on the monitoring photodetection element 7m, and thereby a wavelength selecting film is unnecessary, and flare does not occur and therefore the recording/reproducing operation with respect to the optical recording medium 6 is possible at high quality.

Figure 7A:
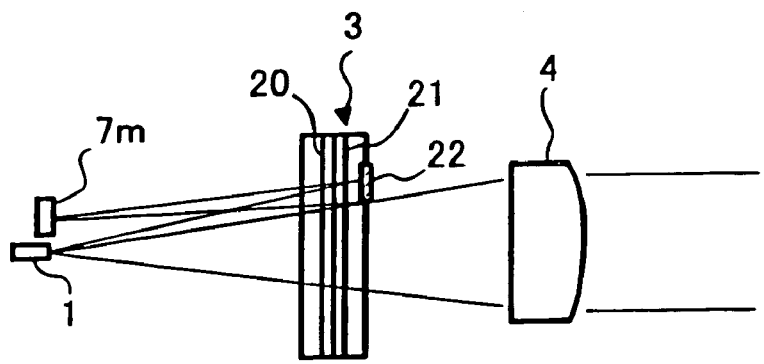
FIGS. 7A to 7C are explanation views of a sixth embodiment.
Figure 7B:
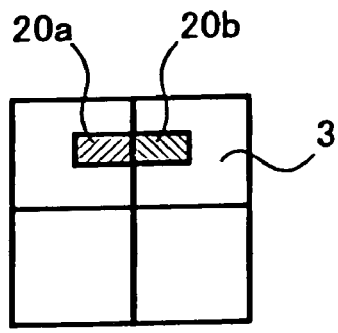
Figure 7C:
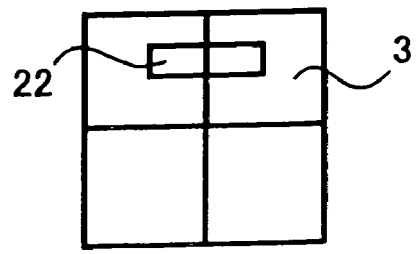

Referring to FIGS. 7A to 7C, a sixth embodiment will be described.

In this embodiment, as illustrated in FIGS. 7A, 7B, and 7C, in the hologram device 3 of a polarization diffraction device, a polarization hologram element 20a for the laser light of wavelength 635 nm or 650 nm and a polarization hologram element 20b for the laser light of wavelength 780 nm are arranged next to each other, and a quarter wavelength plate 21 is integrated with the polarization hologram elements 20a and 20b, and a reflection film 22 is formed facing the polarization hologram elements 20a and 20b on a surface of a side of the collimator lens 4 in the hologram device 3. The grating depth of the polarization hologram element 20a is set so as to be high in diffraction efficiency for the laser light of wavelength 635 nm or 650 nm and so as to be low in diffraction efficiency for the laser light of wavelength 780 nm. The grating depth of the polarization hologram element 20b is set so as to be low in diffraction efficiency for the laser light of wavelength 635 nm or 650 nm and so as to be high in diffraction efficiency for the laser light of wavelength 780 nm.

In this embodiment, the laser light of wavelength 635 nm or 650 nm is transmitted through the polarization hologram elements 20a and 20b and the quarter wavelength plate 21 and is reflected on the reflection film 22, and it is transmitted through the quarter wavelength plate 21 again and thereby the laser light whose polarization direction rotates at 90 degrees is incident on the polarization hologram elements 20a and 20b. In the polarization hologram element 20a which is high in diffraction efficiency for the laser light of wavelength 635 nm or 650 nm, most of the laser light of wavelength 635 nm or 650 nm is incident onto monitoring the photodetection element 7m, and therefore the output level of the laser light of wavelength 635 nm or 650 nm can be monitored.

The laser light of wavelength 780 nm is transmitted through the polarization hologram elements 20a and 20b and the quarter wavelength plate 21 and is reflected on the reflection film 22, and it is transmitted through the quarter wavelength plate 21 again and thereby the laser light whose polarization direction rotates at 90 degrees is incident to the polarization hologram elements 20a and 20b. In the polarization hologram element 20b which is high in diffraction efficiency for the laser light of wavelength 780 nm, most of the laser light of wavelength 780 nm is incident on the monitoring photodetection element 7m, and therefore the output level of the laser light of wavelength 780 nm can be monitored. As described above, a suppression setting device is realized.

For this reason, according to this embodiment, in the hologram device 3, the polarization hologram element 20a which is high in diffraction efficiency for the laser light of wavelength 635 nm or 650 nm and the polarization hologram element 20b which is high in diffraction efficiency for the laser light of wavelength 780 nm are integrated with the quarter wavelength plate 21, and the reflection film 22 is formed on a surface of a side of the collimator lens 4 in the hologram device 3. Further, the photodetection element 7m is integrated with the photodetection device 7. Thereby, the number of devices can be decreased and the structure and the adjusting method can be simplified. At the same time, flare of the laser light of wavelength 635 nm or 650 nm or that of wavelength 780 nm is prevented, and the output level of the laser light is accurately monitored and therefore, the recording/reproducing operation with respect to the optical recording medium 6 is possible at high quality.

Figure 8:
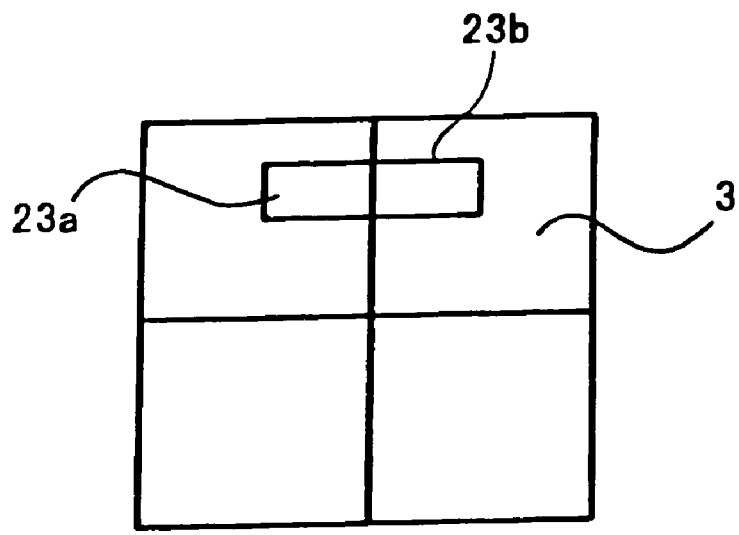
FIG. 8 is an explanation view of a seventh embodiment.
Figure 9:
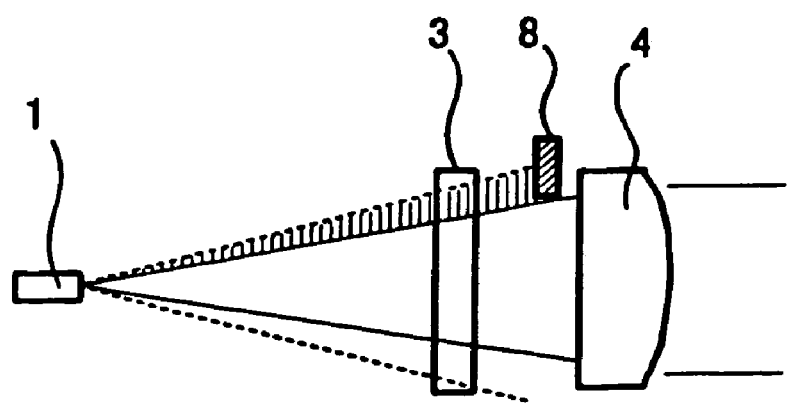
FIG. 9 is an explanation view illustrating prior art monitoring of a laser light in an optical pickup apparatus.
Figure 10:
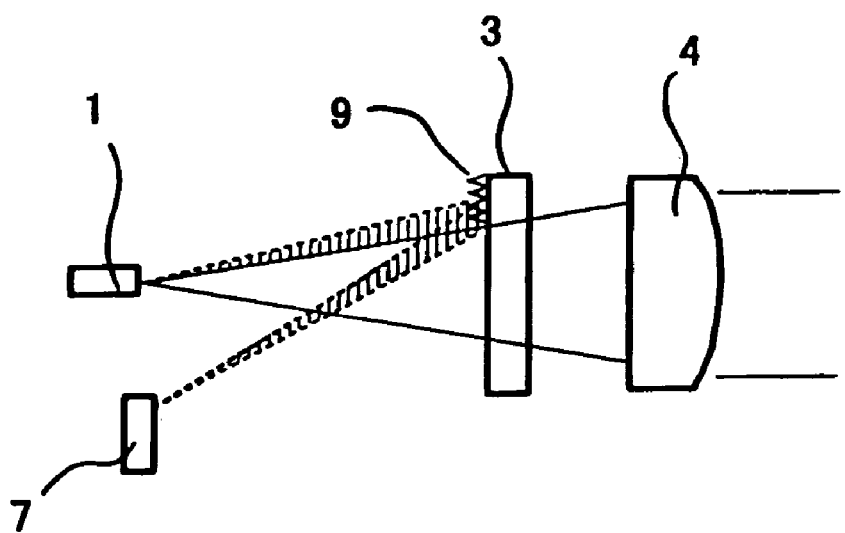
FIG. 10 is an explanation view illustrating another prior art monitoring of a laser light in an optical pickup apparatus.
Figure 11A:
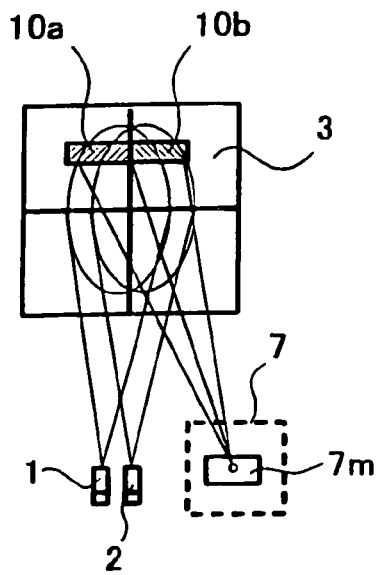
FIGS. 11A to 11C are explanation views illustrating photodetection of a monitor laser light in the optical pickup apparatus in FIG. 10.
Figure 11B:
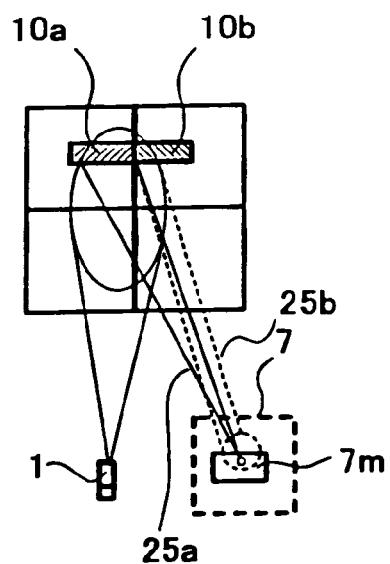
Figure 11C:
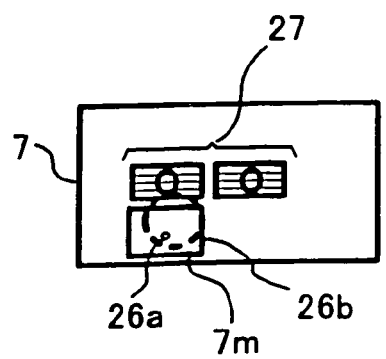

Referring to FIG. 8, a seventh embodiment will be described.

In this embodiment, instead of the selection of wavelength in the sixth embodiment by the polarization hologram elements 20a and 20b described above, the wavelength is selected by a reflection film. As illustrated in FIG. 8, instead of the reflection film 22 in the sixth embodiment, a reflection film 23a which reflects the laser light of wavelength 635 nm or 650 nm and transmits the laser light of wavelength 780 nm is arranged at a position facing the polarization hologram element 20a, and a reflection film 23b which reflects the laser light of wavelength 780 nm and transmits the laser light of wavelength 635 nm or 650 nm is arranged at a position facing the polarization hologram element 20b.

In this embodiment, the laser light of wavelength 635 nm or 650 nm is transmitted through the polarization hologram elements 20a and 20b and the quarter wavelength plate 21, and it is incident on the reflection films 23a and 23b and is reflected on the reflection film 23a. The laser light is transmitted through the quarter wavelength plate 21 again, and the laser light whose polarization direction rotates at 90 degrees is incident on the monitoring photodetection element 7m by the polarization hologram element 20a so that the output level of the laser light of wavelength 635 nm or 650 nm is monitored.

The laser light of wavelength 780 nm is transmitted through the polarization hologram elements 20a and 20b and the quarter wavelength plate 21, and it is incident on the reflection films 23a and 23b and is reflected on the reflection film 23b. The laser light is transmitted through the quarter wavelength plate 21 again, and the laser light whose polarization direction rotates at 90 degrees is incident to the photodetection element for monitor 7m by the polarization hologram element 20b so that the output level of the laser light of wavelength 780 nm is monitored. As described above, a suppression setting device is realized.

For this reason, according to this embodiment, in the hologram device 3, the polarization hologram elements 20a and 20b are integrated with the quarter wavelength plate 21, and the reflection film 23a which has high reflectance for the laser light of wavelength 635 nm or 650 nm and the reflection film 23b which has high reflectance for the laser light of wavelength 780 nm are formed on a surface of the collimator lens 4 in the hologram device 3. Thereby, the number of devices is decreased and the structure and the adjusting method can be simplified. At the same time, flare of the laser light of wavelength 635 nm or 650 nm or that of wavelength 780 nm is prevented, and the output level of the laser light is accurately monitored, and therefore, the recording/reproducing operation with respect to the optical recording medium 6 is possible at high quality.

An eighth embodiment will be described.

When the monitor detection of the laser light is performed by light diffraction with the polarization hologram element as already described in the sixth and the seventh embodiments, the grating pitch needs to be set small and the diffraction angle needs to be set large in order to convert a divergent light to a convergent light.

Usually, LiNbO$_3$ or a liquid crystal is used as material of the polarization hologram element. However, such materials can be difficult to process to make the grating pitch small, and pitch of 3 μm is a current practical limit.

In order to address this, in this embodiment, mainly an organic group macromolecule film having birefringence characteristics such as a polyimide drawn film, a polyester film, or a polycarbonate film is used, and thereby, the polarization hologram element is formed.

The remaining structure in this embodiment is the same as those in the sixth or the seventh embodiment, and therefore its description will not be repeated.

According to this embodiment, the polarization hologram element is made from mainly the organic group macromolecule film having birefringence characteristics such as polyimide drawn film, polyester film, or polycarbonate film, and thereby the technical advantage obtained in the sixth or the seventh embodiment can be realized.

According to one aspect of the present disclosure, in an optical pickup apparatus, a plurality of laser diodes to emit laser light of different wavelengths respectively, and a photodetection device to detect each laser light are installed, and each laser light from the laser diodes is irradiated onto a signal recording surface of an optical recording medium by way of a diffraction type-optical device and each lights reflected from the signal recording medium is detected on the photodetection device by way of the diffraction type-optical device so that recording/reproducing with respect to the optical recording medium is performed, however, the diffraction type-optical device includes reflecting type-diffraction elements to reflect and diffract each laser light of a corresponding wavelength in the laser lights from the light diodes, to the photodetection device so that each laser light is monitored, and a laser light other than a laser light of the corresponding wavelength is suppressed in the reflecting type-diffraction elements by a suppression setting device. Therefore, by monitoring laser light of plural wavelengths with one photodetection device, the size of the apparatus can be reduced by the reducing the number of devices and the manufacturing and the adjusting of the apparatus can be simplified so that the manufacturing cost can be low, and, in the reflecting type-diffraction elements, the laser light other than the laser light of the corresponding wavelength is suppressed, and therefore flare is suppressed and each laser light can be monitored stably and highly accurately.

In this case, the suppression setting device performs each of the following processes or combination of them: a process in which each plural reflecting type-diffraction element is arranged a position such that only the laser light of the corresponding wavelength is diffracted, a process in which only the diffraction efficiency of the laser light of the corresponding wavelength is enhanced, and a process in which coating is performed so as to diffract only the laser light of the corresponding wavelength, and thereby the technical advantages described above can be realized by suppressing flare and improving signal to noise ratio.

According to another aspect of the present disclosure, in an optical pickup apparatus, a plurality of laser diodes to emit laser light of different wavelengths respectively, and a photodetection device to detect each laser light are installed, and each laser light from the laser diodes is irradiated onto a signal recording surface of an optical recording medium by way of a diffraction type-optical device and each light reflected from the signal recording medium is detected on the photodetection device by way of a diffraction type-optical device so that recording/reproducing with respect to the optical recording medium is performed, however, the diffraction type-optical device includes a reflecting type-diffraction element to reflect and diffract a laser light of an intermediate wavelength onto a center position in the photodetection device so that each of the laser light of wavelength 635 nm or 650 nm and 780 nm can be monitored. Therefore, using a single reflecting type-diffraction element simplifies the manufacturing of the apparatus and reduces costs.

According to another aspect of the present disclosure, in an optical pickup apparatus, a plurality of laser diodes to emit laser lights of different wavelengths respectively, and a photodetection device to detect each of the laser lights are installed, and each laser light from the laser diodes is irradiated onto a signal recording surface of an optical recording medium by way of a diffraction type-optical device and each light reflected from the signal recording medium is detected on the photodetection device by way of a diffraction type-optical device so that recording/reproducing with respect to the optical recording medium is performed. In this case, the diffraction type-optical device has reflecting type-diffraction elements, each of which corresponds to each of the wavelengths and each of which has diffraction efficiency depending on a polarization direction of an incident light, and each reflected light incident on the reflecting type-diffraction elements is diffracted at high diffraction efficiency with respect to the corresponding wavelength so that monitor detection of the each of the laser lights is performed. Therefore, two kinds of holograms which are a polarization hologram and a hologram for monitor detection, which are necessary conventionally, can be replaced by one kind of hologram, and thus the number of devices can be decreased, and the manufacturing and the adjusting of the apparatus can be simplified and the manufacturing cost can be reduced.

In this case, the suppression setting device sets each of the reflecting type-diffraction elements to suppress laser light other than the laser light of the corresponding wavelength to the photodetection device, and thereby flare can be suppressed well. Further, the polarization hologram is made from an organic group macromolecule film, and thereby a grating of small pitch can be formed and a diffracted spot of high quality which is low in aberration can be formed.

Numerous modifications and variations of the disclosed embodiments are possible in light of the above teachings. It is therefore to be understood that within the scope of the appended claims, the invention may be practiced other than as specifically described herein.

The present application contains subject matter disclosed in Japanese Patent Application No. 2000-156,986 filed on May 26, 2000 in the Japan Patent Office, to which the present application claims priority, and the entire contents of which are incorporated herein by reference.

What is claimed is:

1. An optical pickup apparatus for reading/reproducing data on an optical recording medium, comprising:
    a plurality of laser diodes configured to emit laser light of different wavelengths respectively;
    a photodetection device configured to detect each laser light;
    a diffraction type-optical device configured to transmit each laser light from the plurality of light diodes to the optical recording medium, and to diffract each laser light from the optical recording medium to the photodetection device; and
    wherein the diffraction type-optical device is a polarization diffraction device which has reflecting type-diffraction elements, each of which corresponds to each of the wavelengths, the each of which has diffraction efficiency depending on a polarization direction of an incident light, and each of which has high diffraction efficiency with respect to a corresponding wavelength.

2. The optical pickup apparatus of claim 1, further comprising a suppression setting device that sets each of the plurality of reflecting type-diffraction elements to suppress laser light other than laser light of the corresponding wavelength to the photodetection device.

3. The optical pickup apparatus of claim 1, wherein the polarization diffraction device is made from an organic group macromolecule film.

4. An optical pickup apparatus for reading/reproducing data on an optical recording medium, comprising:
    a plurality of laser emitting means for emitting laser lights of different wavelengths respectively;
    photodetecting means for detecting each laser light;
    diffracting means for transmitting each laser light from the plurality of light emitting means to the optical recording medium, and for diffracting each laser light from the optical recording medium to the photodetecting means; and
    wherein the diffracting means is polarization diffracting means which has diffraction type-optical elements, each of which corresponds to each of the wavelengths, each of which has diffraction efficiency depending on a polarization direction of an incident light, and each of which has high diffraction efficiency with respect to a corresponding wavelength.

5. An optical pickup method for reading/reproducing data on an optical recording medium, comprising:
    emitting laser light of different wavelengths respectively by a plurality of laser diodes;
    detecting each laser light by a photodetection device;
    transmitting each laser light from the plurality of light diodes to the optical recording medium, and diffracting each laser light from the optical recording medium to the photodetection device by a diffraction type-optical device; and
    including diffracting at efficiency depending on a polarization direction of an incident light, and diffracting at high efficiency with respect to a corresponding wavelength, by a polarization diffraction device which has diffraction type-optical elements each of which corresponds to each of the wavelengths.

* * * * *